US008839148B2

(12) United States Patent
Stoev et al.

(10) Patent No.: US 8,839,148 B2
(45) Date of Patent: Sep. 16, 2014

(54) METHOD AND APPARATUS FOR MANAGING PROCESSING RESOURCES IN A PORTABLE ELECTRONIC DEVICE

(75) Inventors: Orlin Vesselinov Stoev, Toronto (CA); Michael William Brown, Toronto (CA)

(73) Assignee: BlackBerry Limited, Waterloo, Ontario (CA)

( * ) Notice: Subject to any disclaimer, the term of this patent is extended or adjusted under 35 U.S.C. 154(b) by 368 days.

(21) Appl. No.: 12/899,610

(22) Filed: Oct. 7, 2010

(65) Prior Publication Data

US 2012/0088552 A1 Apr. 12, 2012

(51) Int. Cl.

*G06F 3/048* (2013.01)
*G06F 3/00* (2006.01)
*G09G 5/377* (2006.01)

(52) U.S. Cl.

CPC ............ *G09G 5/377* (2013.01); *G09G 2340/12* (2013.01); *G09G 2360/121* (2013.01); *Y10S 715/968* (2013.01)

USPC ........... 715/835; 715/739; 715/769; 715/838; 715/869; 715/968

(58) Field of Classification Search

USPC ......... 715/790, 739, 769, 838, 863, 968, 835; 455/566; 345/619

See application file for complete search history.

(56) References Cited

U.S. PATENT DOCUMENTS

| | | | | |
|---|---|---|---|---|
| 5,544,358 | A * | 8/1996 | Capps et al. | 715/201 |
| 2006/0020904 | A1 | 1/2006 | Aaltonen et al. | |
| 2007/0229518 | A1 | 10/2007 | Kii et al. | |
| 2007/0238489 | A1 | 10/2007 | Scott | |
| 2008/0092054 | A1 * | 4/2008 | Bhumkar et al. | 715/739 |
| 2008/0195961 | A1 * | 8/2008 | Bae et al. | 715/769 |
| 2011/0252375 | A1 * | 10/2011 | Chaudhri | 715/835 |
| 2011/0252381 | A1 * | 10/2011 | Chaudhri | 715/838 |

FOREIGN PATENT DOCUMENTS

| | | | |
|---|---|---|---|
| EP | 1 748 630 | A2 | 1/2007 |
| EP | 1 777 611 | A1 | 4/2007 |
| EP | 1956473 | A1 | 8/2008 |

(Continued)

OTHER PUBLICATIONS

Comparing samrtphone UIs_The Status bar published on Feb. 4, 2010 http://usersarehuman.wordpress.com/2010/02/04/comparing-smartphone-u is-the-status-bar.*

(Continued)

*Primary Examiner* — Boris Pesin
*Assistant Examiner* — Rinna Yi
(74) *Attorney, Agent, or Firm* — Perry + Currier Inc.

(57) ABSTRACT

A method and apparatus managing processing resources in a portable electronic device are provided. An area of the display device is controlled to provide a banner region comprising device state data, the area of the display device enabled to receive focus using an input device. While focus is in the banner region, first input data is receiving, and the display device is responsively controlled to provide in the banner region an indication of the first application, replacing the device state data. Further input data is received while the indication of the first application is provided in the banner region. In response and, in response, at least one of the following occurs: the first application is brought to the foreground by controlling the display device to provide a representation of the first application; and the first application is closed such that resources used by the processing unit are reduced.

19 Claims, 12 Drawing Sheets

(56) References Cited

FOREIGN PATENT DOCUMENTS

| | | | |
|---|---|---|---|
| EP | 1 976 240 | A1 | 10/2008 |
| EP | 2136290 | A2 | 12/2009 |
| WO | 02/10893 | A2 | 2/2002 |
| WO | 2008/132536 | A1 | 11/2008 |

OTHER PUBLICATIONS

Comparing Smartphone Uls: the Status Bar http://usersarehumans.wordpress.com/2010/02/04/comparing-smartphone-uis-the-status-bar/Downloaded on Dec. 1, 2010.

Google Nexus One Review by Brad Linder Downloaded on Oct. 26, 2010.

BB Task Switcher http://advice.cio.com/al__sacco/blackberry__tips__tricks__escape__as__app__switcher__free__up__convenience__key Downloaded on Dec. 1, 2010.

Windows "Alt-Tab" http://en-wikipedia.org/wiki/Alt-Tab Downloaded on Dec. 2, 2010.

Android Developers Click on Status bar notification switch to task in current state? Published Aug. 16, 2009.

Kirikae iPhone Task Switcher 1 "Kirikae Review for iphone via cydia" [http://www.youtube.com/watch?v=DKMpaqQdFPU&feature=related] Sep. 10, 2009 (included on disc attached).

Kirikae iPhone Task Switcher 1 "Backgrounder Kirikae on iphone" [http://www.youtube.com/watch?v=vEYyFfic9DI] Oct. 3, 2009 (included on disc attached).

PalmPre WebOS Palm pre multitasking [http://www.youtube.com/watch?v=POrGiwdyQ4E ] Jul. 3, 2009 (included on disc attached).

"ProSwitcher for iPhone" [http://www.precentral.net/proswitcher-brings-webos-style-multitasking-jailbroken-iphones] Dec. 13, 2009 (embedded video included on disc attached).

Android Task Switcher [http://www.androidapps.com/t/task-switcher] Nov. 11, 2009 (embedded video included on disc attached).

European Patent Application No. 10186796.8 Search Report dated Mar. 14, 2011.

* cited by examiner

METHOD AND APPARATUS FOR MANAGING PROCESSING RESOURCES IN A PORTABLE ELECTRONIC DEVICE

FIELD

The specification relates generally to portable electronic devices, and specifically to a method and apparatus for managing processing resources in a portable electronic device.

BACKGROUND

Applications running in the background on a portable electronic device drain processing resources causing the portable electronic device to appear sluggish and cause a battery in the portable electronic device to run down.

BRIEF DESCRIPTIONS OF THE DRAWINGS

Implementations are described with reference to the following figures, in which.

DETAILED DESCRIPTION OF THE IMPLEMENTATIONS

Figure 1:
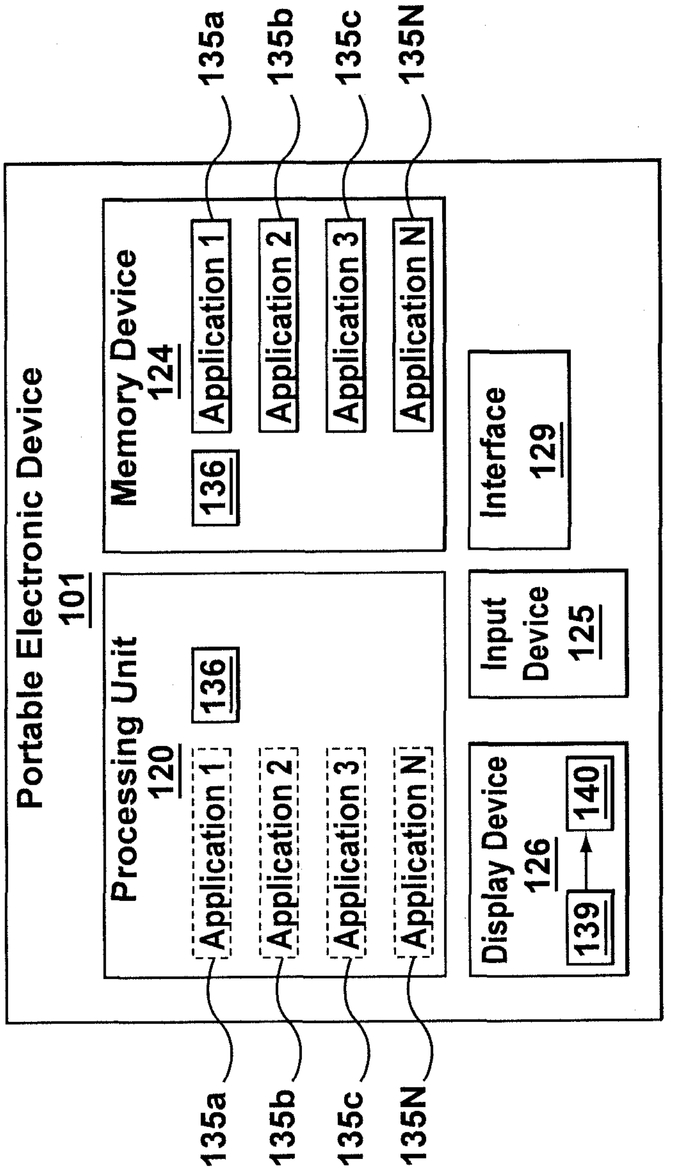
FIG. 1 depicts a portable electronic device for managing processing resources, according to non-limiting implementations.

An aspect of the specification provides a method for managing processing resources in a portable electronic device comprising a processing unit interconnected with a display device, a memory device and an input device, the processing unit processing a plurality of applications in the background such that the plurality of applications are initially not viewable on the display device, the method comprising: controlling an area of the display device to provide a banner region comprising device state data, the area of the display device enabled to receive focus using the input device; while the focus is in the banner region, receiving first input data, and responsively controlling the display device to provide in the banner region an indication of the first application, the indication of the first application replacing the device state data; and, receiving further input data while the indication of the first application is provided in the banner region and, in response, at least one of: bringing the first application to the foreground by controlling the display device to provide a representation of the first application; and closing the first application such that resources used by the processing unit are reduced.

The method of can further comprise: prior to receiving the further input data, successively receiving next input data similar to the first input data, and for each set of the next input data received, providing a next indication of a next application of the plurality of applications, the next indication replacing a previous indication of a previous application of the plurality of applications; and once the further input data is received, at least one of: bringing a present application associated with a presently provided indication provided in the banner region to the foreground by controlling the display device to provide a representation of the present application; and closing the present application such that the resources used by the processing unit are reduced.

Responsively controlling the display device to provide in the banner region an indication of the first application can comprise: controlling circuitry in the area of the display device to cause the device state data to move towards a first lateral edge of the display device; and, controlling the circuitry to cause the indication to appear from a second lateral edge of the display device, the second lateral edge opposite the first lateral edge.

Bringing the first application to the foreground by controlling the display device to provide a representation of the first application can comprise: controlling circuitry of the display device to cause the representation to scroll from the banner region to a bottom edge of the display device. The method can further comprise receiving additional input data causing the first application to be sent to the background and responsively controlling the circuitry to cause the representation to scroll to the banner region.

The method can further comprise removing the banner region from the display device after receiving the further input data.

The banner region can be removed from the display device after a given time period such that next input data similar to the first input data can be received during the given time period causing a next indication of a next application of the plurality of applications to be provided in the banner region so that the next application can be at least one of brought to the foreground and closed, a representation of the next application replacing the representation of the first application when the next application is brought to the foreground.

The input device can comprise at least one of a touch screen device and a pointing device and the first input data can comprise at least one of: data received from the touch screen device indicative that a lateral swipe has occurred in the area of the display device; and data received from the pointing device indicative that a lateral actuation has occurred at the pointing device.

The indication of the first application can comprise at least one an icon indicative of the first application and text indicative of the first application.

Another aspect of the specification provides a portable electronic device comprising: a processing unit interconnected with a display device, a memory device and an input device, the processing unit processing a plurality of applications in the background such that the plurality of applications are initially not viewable on the display device, the processing unit enabled to: control an area of the display device to provide a banner region comprising device state data, the area of the display device enabled to receive focus using the input device; while the focus is in the banner region, receiving first input data, responsively control the display device to provide in the banner region an indication of the first application, the indication of the first application replacing the device state data; and, receive further input data while the indication of the first application is provided in the banner region and, in response, at least one of: bringing the first application to the foreground by controlling the display device to provide a representation of the first application; and closing the first application such that resources used by the processing unit are reduced.

The processing unit can be further enabled to: prior to receiving the further input data, successively receive next input data similar to the first input data, and for each set of the next input data received, provide a next indication of a next application of the plurality of applications, the next indication replacing a previous indication of a previous application of the plurality of applications; and once the further input data is received, at least one of: bring a present application associated with a presently provided indication provided in the banner region to the foreground by controlling the display device to provide a representation of the present application; and close the present application such that the resources used by the processing unit are reduced.

To responsively control the display device to provide in the banner region an indication of the first application, the processing unit can be further enabled to: control circuitry in the area of the display device to cause the device state data to move towards a first lateral edge of the display device; and, control the circuitry to cause the indication to appear from a second lateral edge of the display device, the second lateral edge opposite the first lateral edge.

To bring the first application to the foreground by controlling the display device to provide a representation of the first application, the processing unit can be further enabled to: control circuitry of the display device to cause the representation to scroll from the banner region to a bottom edge of the display device. The processing unit can be further enabled to receive additional input data causing the first application to be sent to the background and responsively control the circuitry to cause the representation to scroll to the banner region.

The processing unit can be further enabled to remove the banner region from the display device after receiving the further input data.

The banner region can be removed from the display device after a given time period such that next input data similar to the first input data can be received during the given time period causing a next indication of a next application of the plurality of applications to be provided in the banner region so that the next application can be at least one of brought to the foreground and closed, a representation of the next application replacing the representation of the first application when the next application is brought to the foreground.

The input device can comprise at least one of a touch screen device and a pointing device and the first input data can comprise at least one of: data received from the touch screen device indicative that a lateral swipe has occurred in the area of the display device; and data received from the pointing device indicative that a lateral actuation has occurred at the pointing device.

The indication of the first application can comprise at least one an icon indicative of the first application and text indicative of the first application.

A further aspect of the specification provides a computer program product, comprising a computer usable medium having a computer readable program code adapted to be executed to implement a method for managing processing resources in a portable electronic device comprising a processing unit interconnected with a display device, a memory device and an input device, the processing unit processing a plurality of applications in the background such that the plurality of applications are initially not viewable on the display device, the method comprising: controlling an area of the display device to provide a banner region comprising device state data, the area of the display device enabled to receive focus using the input device; while the focus is in the banner region, receiving first input data, and responsively controlling the display device to provide in the banner region an indication of the first application, the indication of the first application replacing the device state data; and, receiving further input data while the indication of the first application is provided in the banner region and, in response, at least one of: bringing the first application to the foreground by controlling the display device to provide a representation of the first application; and closing the first application such that resources used by the processing unit are reduced.

FIG. 1 depicts a portable electronic device 101, according to non-limiting implementations, Portable electronic device 101, which will also be referred to hereafter as device 101, comprises a processing unit 120 interconnected with a memory device 124, an input device 125, a display device 126 and an optional communication interface 129, for example via a computing bus (not depicted). Memory device 124, which will also be referred to as memory 124, stores applications 135*a*. 135*b*, 135*c*, 135N (collectively applications 135 and generically an application 135). Further, any suitable subset of applications 135 can be processed by processing unit 120, the subset of applications 135 running in the background: in other words, the subset of applications 135 are processed by processing unit 120 but are not viewable at display device 126. Display device 126 will also be referred to as display 126 hereafter. It is further appreciated that while four applications 135 are depicted as stored in memory 124 in FIG. 1, it is appreciated that any suitable number of applications 135 can be stored in memory 124 and that the subset of applications 135 processed by processing unit 120 in the background can also be any suitable number.

Device 101 can further comprise an application 136 for managing processing resources. Application 136 can be stored in memory 124 and processed by processing unit 120. In particular processing of application 136 enables device 101 to at least one of: bring a given application 135 to the foreground such that the given application 135 is viewable at display 126; and close the given application 135 to reduce resources used by processing unit 120, as will be described below.

In general, device 101 comprises any suitable portable electronic device for processing applications 135, 136, including but not limited to any suitable combination of portable computing devices, mobile computing devices, laptop computing devices, portable electronic devices, mobile electronic devices, PDAs (personal digital assistants), cellphones, smartphones and the like. Other suitable portable electronic devices are within the scope of present implementations.

Processing unit 120 comprises any suitable processor, or combination of processors, including but not limited to a microprocessor, a central processing unit (CPU) and the like. Other suitable processing units are within the scope of present implementations.

Memory 124 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory device 124 is enabled to store applications 135, 136.

Input device 125 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Display device 126 comprises circuitry 139 for generating representations of data, for example a representation 140 of applications 135, 136, as will be described below. Display device 126 can include any suitable one of or combination of CRT (cathode ray tube) and/or flat panel displays (e.g. LCD (liquid crystal display), plasma, OLED (organic light emitting diode), capacitive or resistive touchscreens, and the like).

Circuitry 139 can include any suitable combination of circuitry for controlling the CRT and/or flat panel displays etc., including but not limited to display buffers, transistors, electron beam controllers, LCD cells, plasmas cells, phosphors etc. In particular, display device 126 and circuitry 139 can be controlled by processing unit 120 to generate representation 140.

In particular, attention is directed to FIG. 2 which depicts non-limiting implementations of display 126 and circuitry 139, in communication with processing unit 120 and a memory cache 227 (hereinafter cache 227). In some implementations, memory 124 can comprise cache 227, while in other implementations cache 227 can comprise a separate memory device. Furthermore, processing unit 120 is in communication with cache 227 and further enabled to control circuitry 139. In particular, processing unit 120 is enabled to control an area 230 of circuitry 139 to provide indications of applications 135, as will be described below, data 240 for controlling area 230 initially stored in cache 227.

Figure 2:
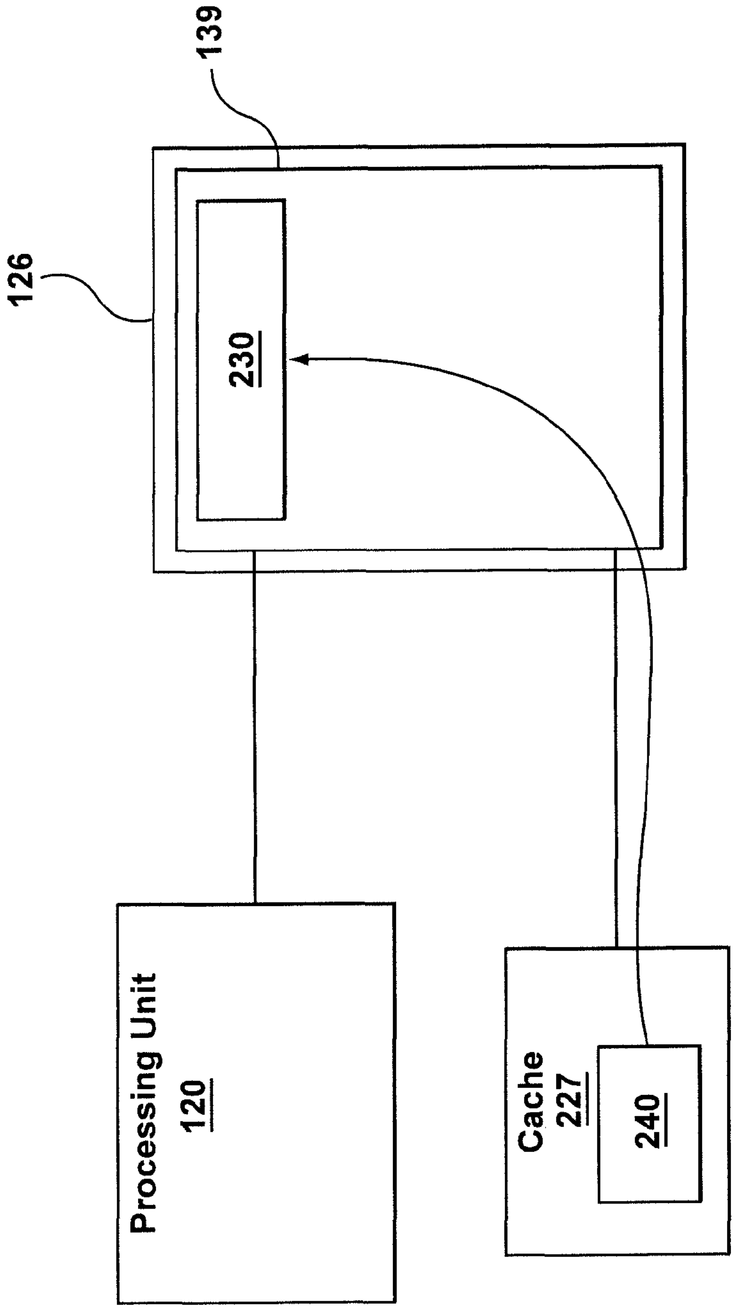
FIG. 2 depicts certain elements of the portable electronic device of FIG. 1, according to non-limiting implementations.

In implementations depicted in FIG. 2, it is appreciated that circuitry 139 and area 230 comprise, for example, transistors in a flat panel display; however, in other implementations, circuitry 139 can comprise a combination of an electron gun in a CRT, and area 230 can comprise phosphors in a CRT.

Communication interface 129, when present, comprises any suitable communication interface, or combination of communication interfaces. In particular communication interface 129 is enabled to communicate with via a network (not depicted), the network being wired and/or wireless as desired. Accordingly, communication interface 129 (which will also be referred to as interface 129 hereafter) is enabled to communicate according to any suitable protocol which is compatible with the network, including but not limited to wired protocols, USB (universal serial bus) protocols, serial cable protocols, wireless protocols, cell-phone protocols, wireless data protocols, Bluetooth protocols, NFC (near field communication) protocols and/or a combination, or the like. In some implementations, interface 129 can be enabled to communicate with remote computing devices (e.g. servers, other computing devices, other mobile electronic devices, etc.), via any suitable communication network according to any suitable protocol, including but not limited to packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations.

Figure 3:
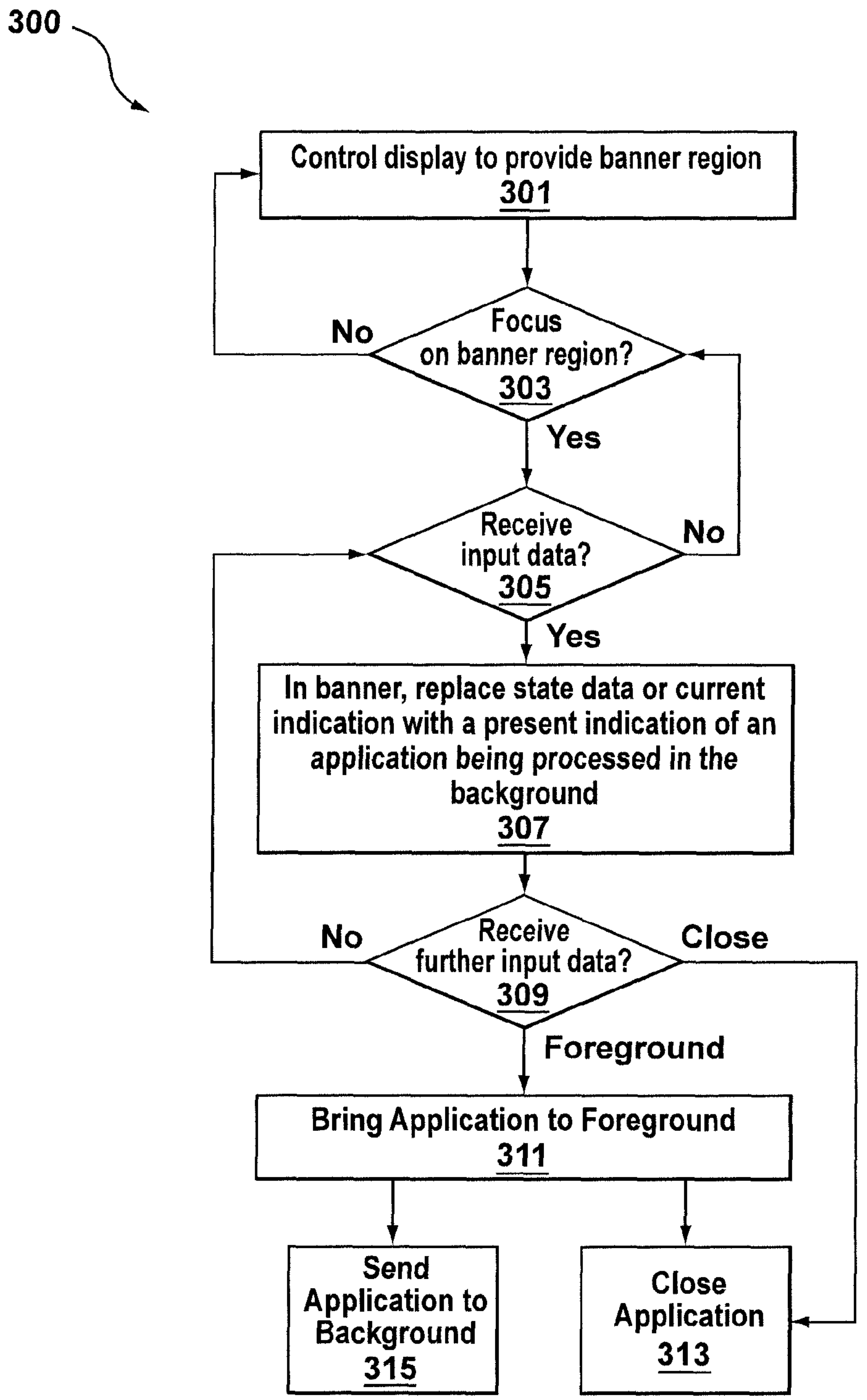
FIG. 3 depicts a method for managing processing resources, according to non-limiting implementations.

Attention is now directed to FIG. 3 which depicts a method 300 for managing processing resources in a portable electronic device. In order to assist in the explanation of method 300, it will be assumed that method 300 is performed using device 101. Furthermore, the following discussion of method 300 will lead to a further understanding of device 101 and its various components. However, it is to be understood that device 101 and/or method 300 can be varied, and need not work exactly as discussed herein in conjunction with each other, and that such variations are within the scope of present implementations.

In particular, it is appreciated that method 300 can be carried out at device 101 by processing application 136, and that application 136 can comprise method 300. It is yet further appreciated that each of the steps of method 300 are performed by processing unit 120.

At 301, area 230 of display 126 is controlled to provide a banner region comprising device state data. For example, attention is directed to FIG. 4 which depicts a graphic user interface (GUI) 400 provided at display 126 which includes a banner region 401 and device state data 402. Device state data 402 can include, but is not limited to a battery indicator, network connectivity, a time, a date and the like. It is appreciated that absent from banner region 401 and GUI 400 are any indications of applications 135 that might be running in the background. It is further appreciated that GUI 400 can include indicators 403, such as icons etc., which when actuated cause an associated application to be opened and/or processed by processing unit 120.

Returning to FIG. 3, at 303, it is determined whether focus is on banner region 401. It is appreciated that focus indicates which component of GUI 400 is currently selected to receive input. For example, data can be received from input device 125 indicative that focus is on banner region 401. When focus is not on banner regions 401, 301 repeats until focus is on banner region 401. It is appreciated, however, that between 301 and 303, other processes can be performed at device 101. For example, applications can be opened and/or closed, or the like.

Figure 4:
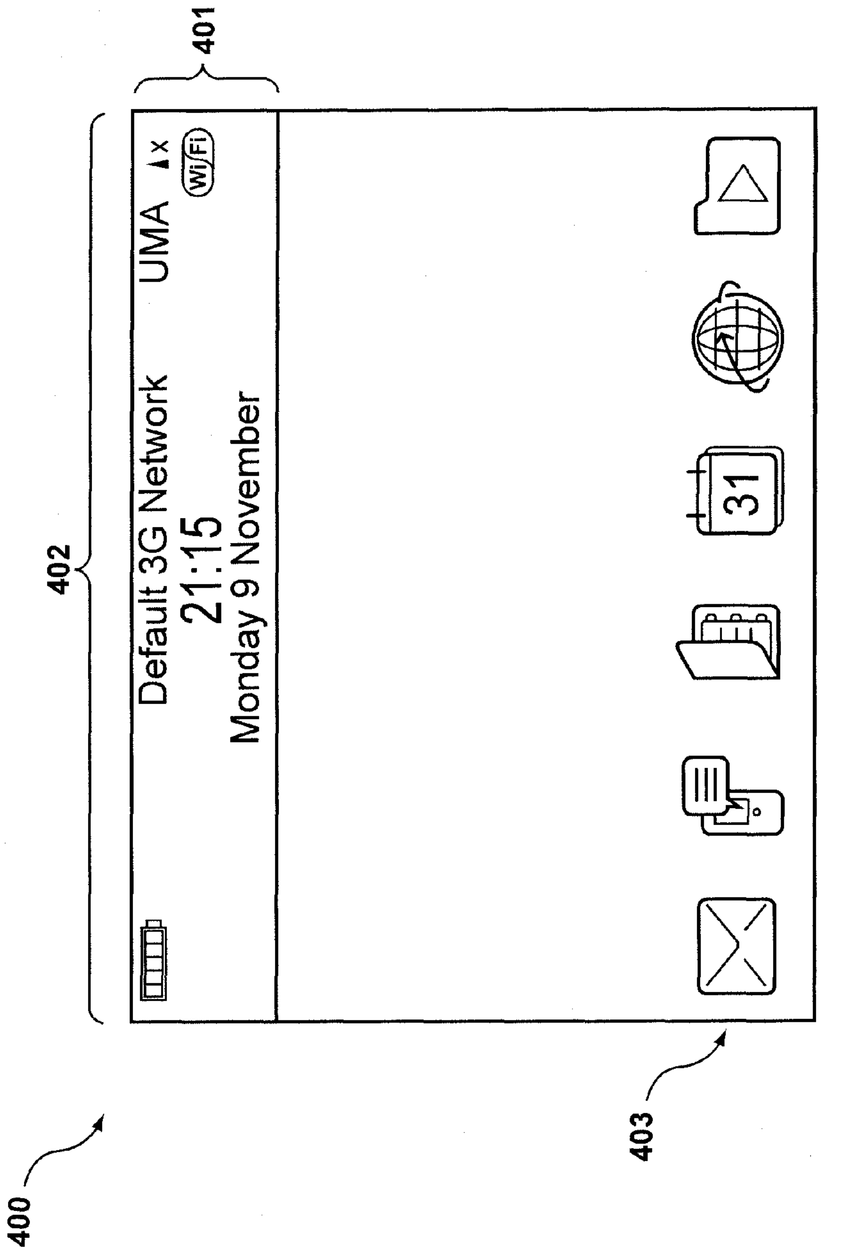
FIGS. 4 to 12 depict a graphic user interface for management of processing resources, according to non-limiting implementations.
Figure 5:
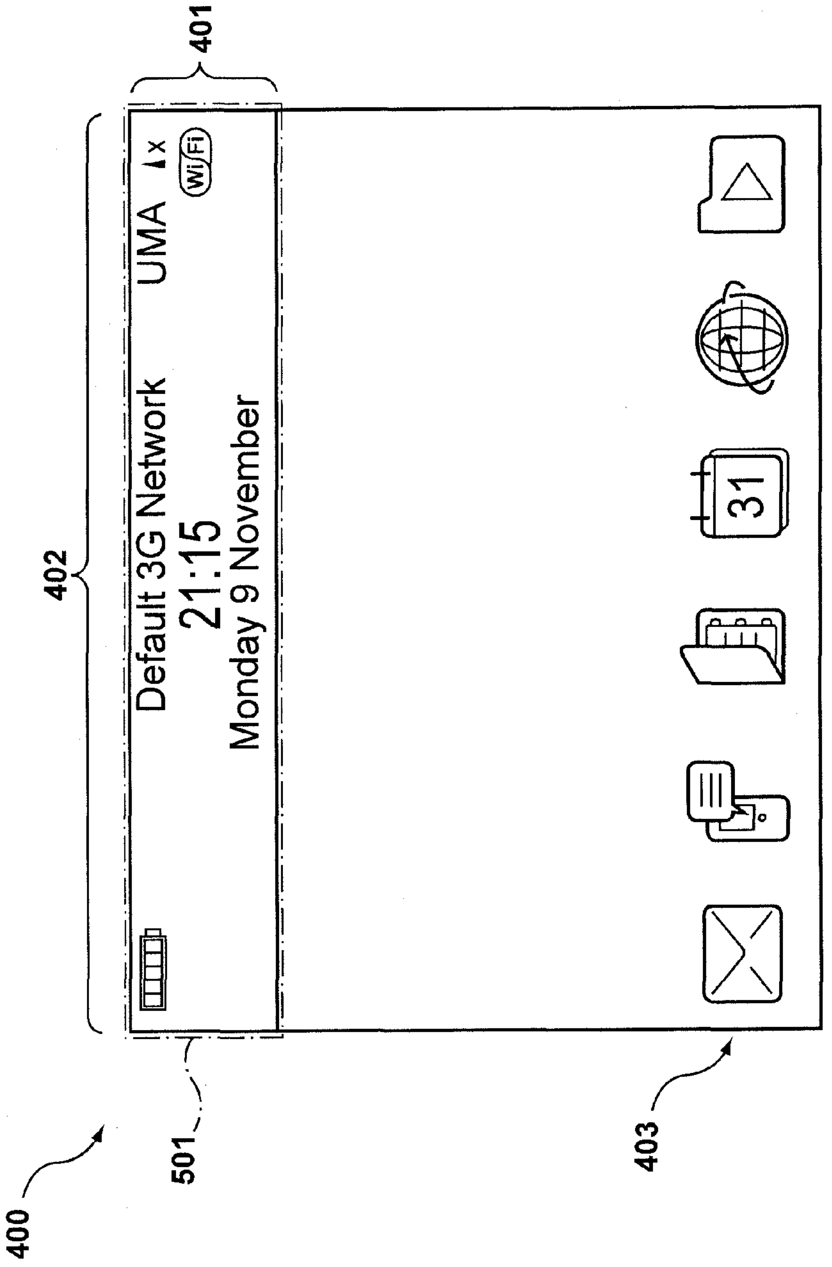

However, at 303, when focus is determined to be on banner region 401, focus on banner region 401 can be optionally visually indicated using any suitable method: for example, as depicted in FIG. 5 (similar to FIG. 4 with like elements having like numbers), focus is visually indicated using a box 501 around banner region 401. Alternatively, focus can be visually indicated by highlighting banner region 401, and/or by changing a colour, font or the like in banner region 401. Any other suitable method of indicating focus on banner region 401 is within the scope of present implementations. Further the method of indicating focus on banner regions 401 is not to be considered particularly limiting.

Again returning to FIG. 3, at 305, while focus is on banner region 301, input data is received from input device 125 that responsively triggers processing unit 120 to control display 126 to provide, in banner region 401, an indication of a first application 135*a* of applications 135. While in the present description, application 135*a* is designated as first application 135, it is appreciated that such a designation is merely exemplary and any of applications 135 can be designated as “first”. Furthermore, at 307, the indication of first application 135*a* replaces the device state data 402 in banner region 401.

For example, when input device 125 comprises a touch screen device, the input data of 305 can comprise data received from the touch screen device indicative that a swipe has occurred in area 230 of display 126, for example a lateral swipe (i.e. from one side to the other side of display 126, across area 230). When input device 125 comprises a pointing device, the input data of 305 can comprise data received from pointing device indicative that a lateral actuation has occurred at the pointing device, e.g. substantially equivalent to a lateral swipe received from a touch screen.

Figure 6:
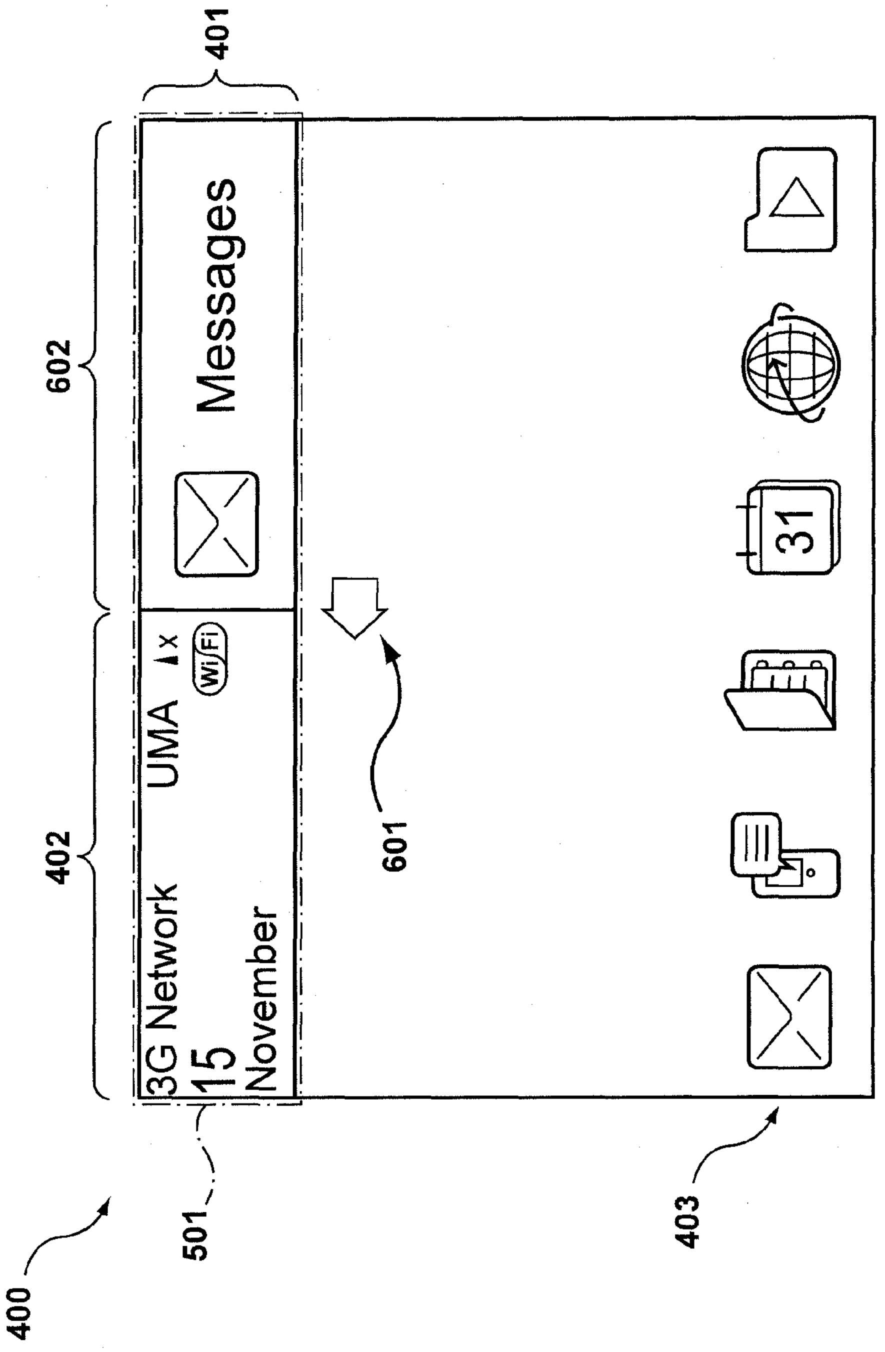
Figure 7:
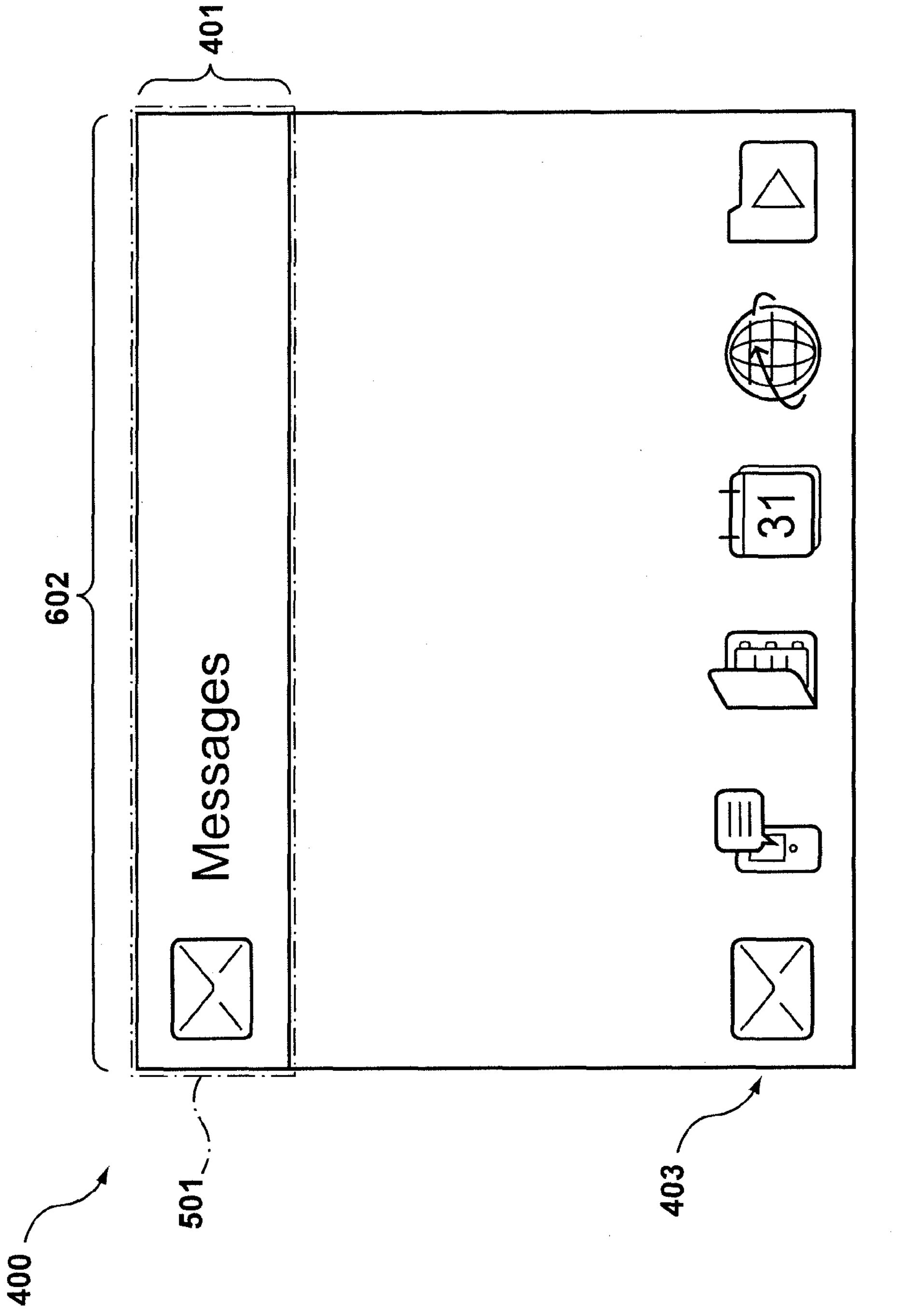

For example, attention is directed to FIG. 6, which is substantially similar to FIG. 4 with like elements having like numbers. It is appreciated that in FIG. 6, as represented by arrow 601 that input data has been received indicating a lateral swipe across area 230 in banner region 401, from a right side of display 126 to a left side of display 126. In response, device state data 402 is replaced with an indication 602 of first application 135*a*, which in depicted implementations is a message application. Hence, circuitry 139 in area 230 of display 126 is controlled to cause device state data 402 to move towards a first lateral edge of display 126 to further cause indication 602 to appear from a second lateral edge of display 126, second lateral edge opposite first lateral edge, replacing device state data 402 as it moves towards the first lateral edge. In other words, a sliding animation is provided in which display 126 is controlled in area 230 to replace device state data 402 with indication 602. The state of GUI 400 after indication 602 replaces device state data 402 is depicted in FIG. 7.

It is appreciated, however, that while a lateral swipe and a lateral sliding animation is provided in exemplary implementations, the method of replacing device state data 402 with indication 602 in banner region 401 is substantially non-limiting. For example the swipe could be in any suitable direction and/or the swipe could be replaced with a tap and/or click sequence, or the equivalent, using input device 125. Further the sliding animation could be replaced with device state data 402 fading into indication 602 and/or indication 602 replacing device state data 402 step wise and/or abruptly. Indeed, any suitable combination of suitable input data types and suitable replacement methods are within the scope of present implementations.

It is yet further appreciated that indication 602 can comprise at least one an icon indicative of first application 135*a* (e.g. an icon representative of an envelope or any other suitable icon indicative of a message application) and text indicative of first application 135*a* (e.g. "Message", or any other suitable text).

Returning to FIG. 3, in some implementations, 305 can be repeated, such that next input data similar to the "swipe" input data described above can be received any suitable number of times; for each set of next input data received, a next indication of a next application 135 is provided, the next indication replacing a previous indication of a previous application 135 of the plurality of applications 135 and/or a subset of the applications 135 that are running in the background.

It is further appreciated that a decision occurs at 309 as to whether or not receipt of further data has occurred, the further data indicative that a present application 135 associated with a currently provided indication in banner region 401 is to be at least one of: brought to the foreground; and closed, as will be described below.

Figure 8:
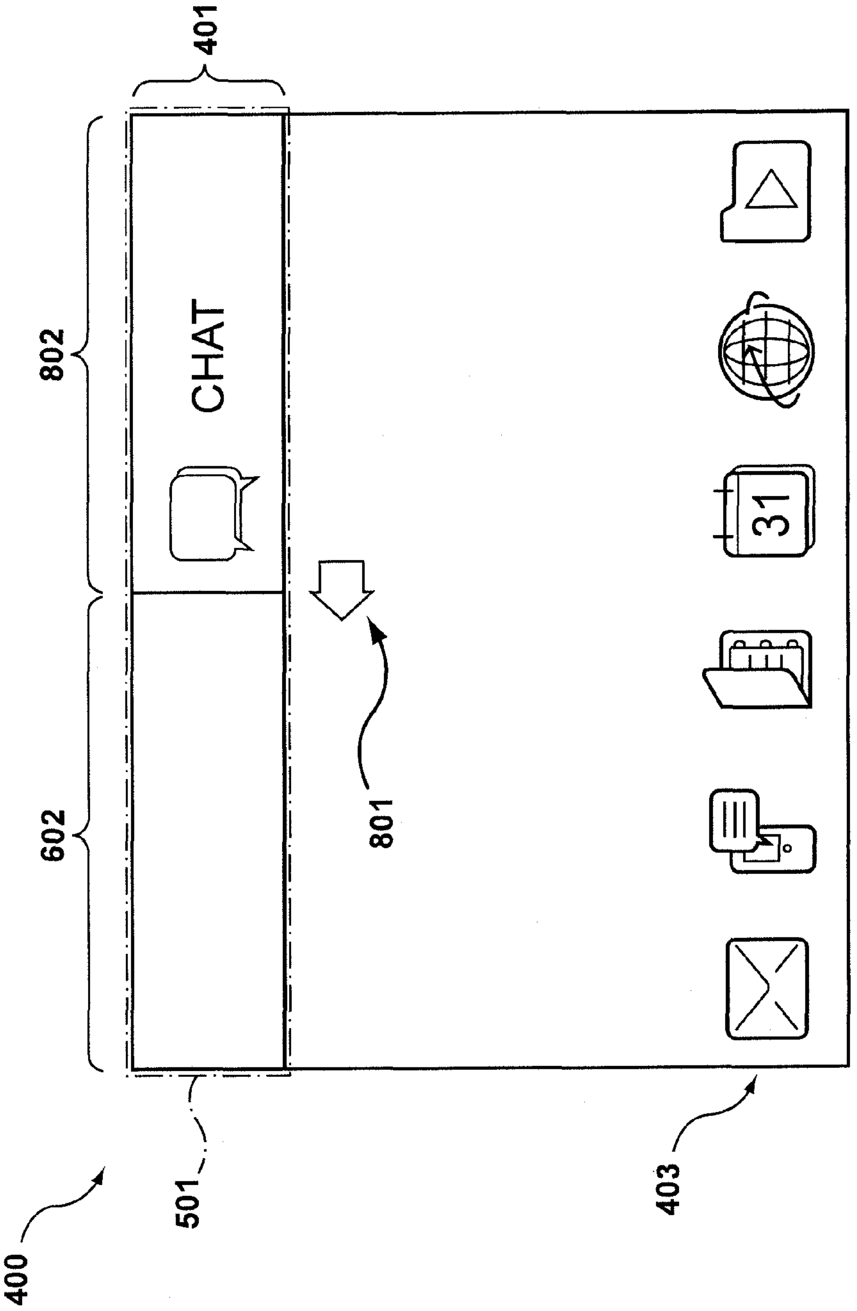
Figure 9:
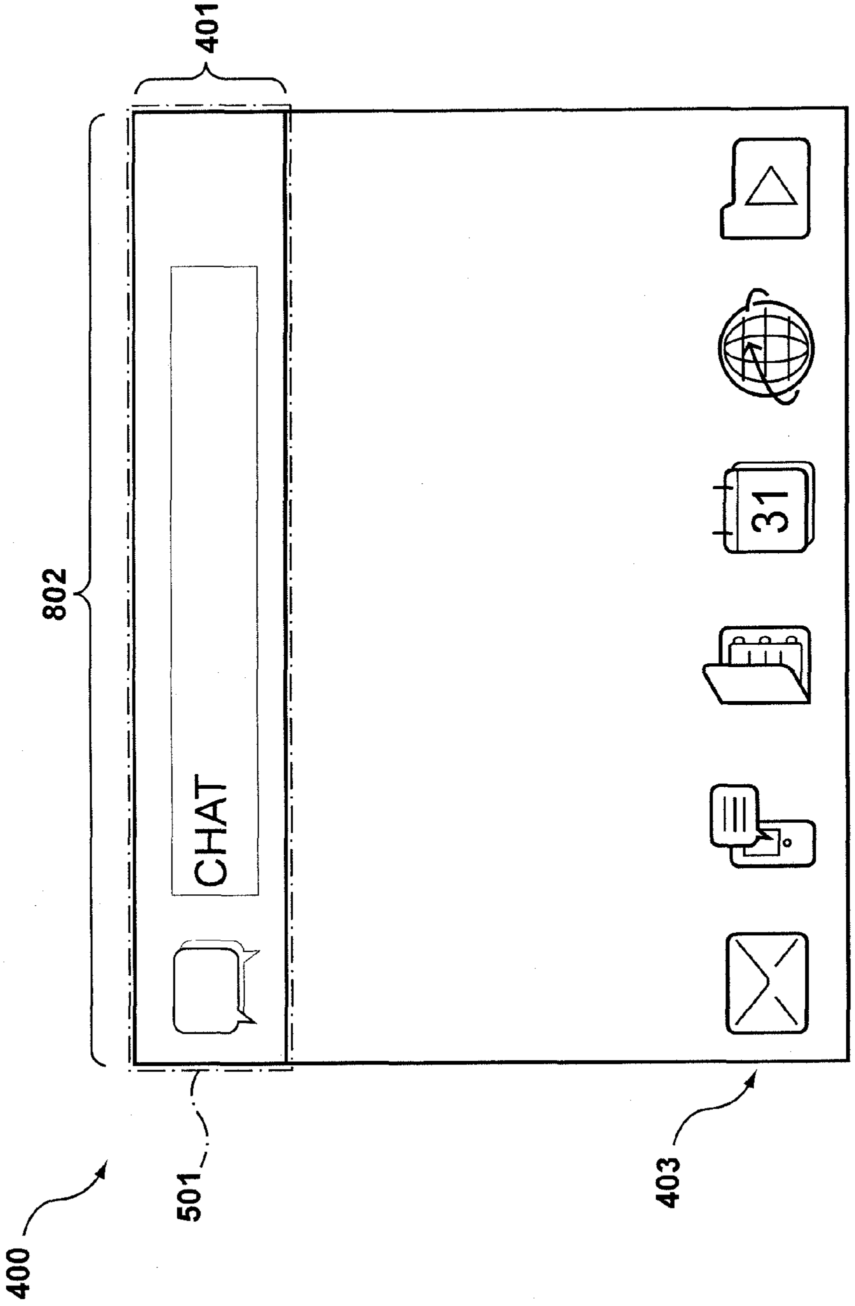

For example FIG. 8 depicts implementations where 305 repeats (i.e. the decision at 309 is "No"), and arrow 801 indicates that another swipe, or the like, has occurred at input device 125. Hence, indication 602 is replaced with indication 802 of application 135*b*, via the sliding animation. The state of GUI 400 after indication 802 replaces indication 602 is depicted in FIG. 9. As appreciated from FIGS. 8 and 9, in exemplary implementations, application 135*b* comprises a chat application.

Repetition of steps 305 to 309 can continue indefinitely, cycling through applications 135 (i.e. the subset of applications 135 that are running in the background) until further input data is received at 309. In some instances, a swipe in a direction opposite arrows 601, 801 (i.e. left to right) cause an indication of a previous application 135 to be provided. Further, when an indication of a last application 135N is reached and another swipe is detected, then application 136 can cycle back to first application 135*a*.

Figure 10:
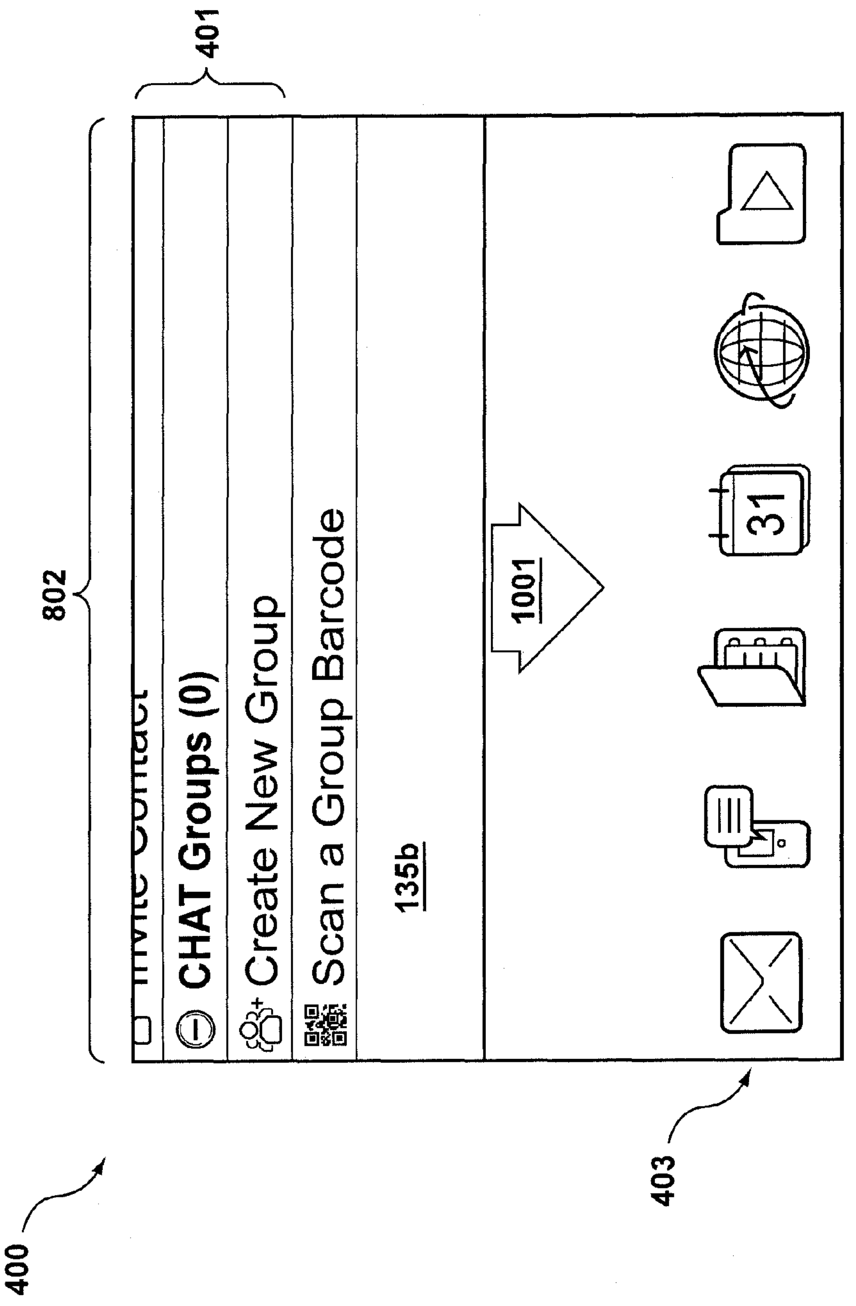

In any event, further data can comprise any suitable data indicative that a present application 135 associated with a presently provided indication, for example indication 802 in FIGS. 8 and 9, is to be brought to the foreground and/or closed, as will be presently described. For example, as depicted in FIG. 10, which is substantially similar to FIG. 9, with like elements having like numbers, further data can comprise a swipe, or the equivalent, using input device 125, in a direction from the top to bottom of GUI 400 (e.g. top to bottom of display 126). Such a swipe, or the equivalent, is indicated by arrow 1001.

Figure 11:
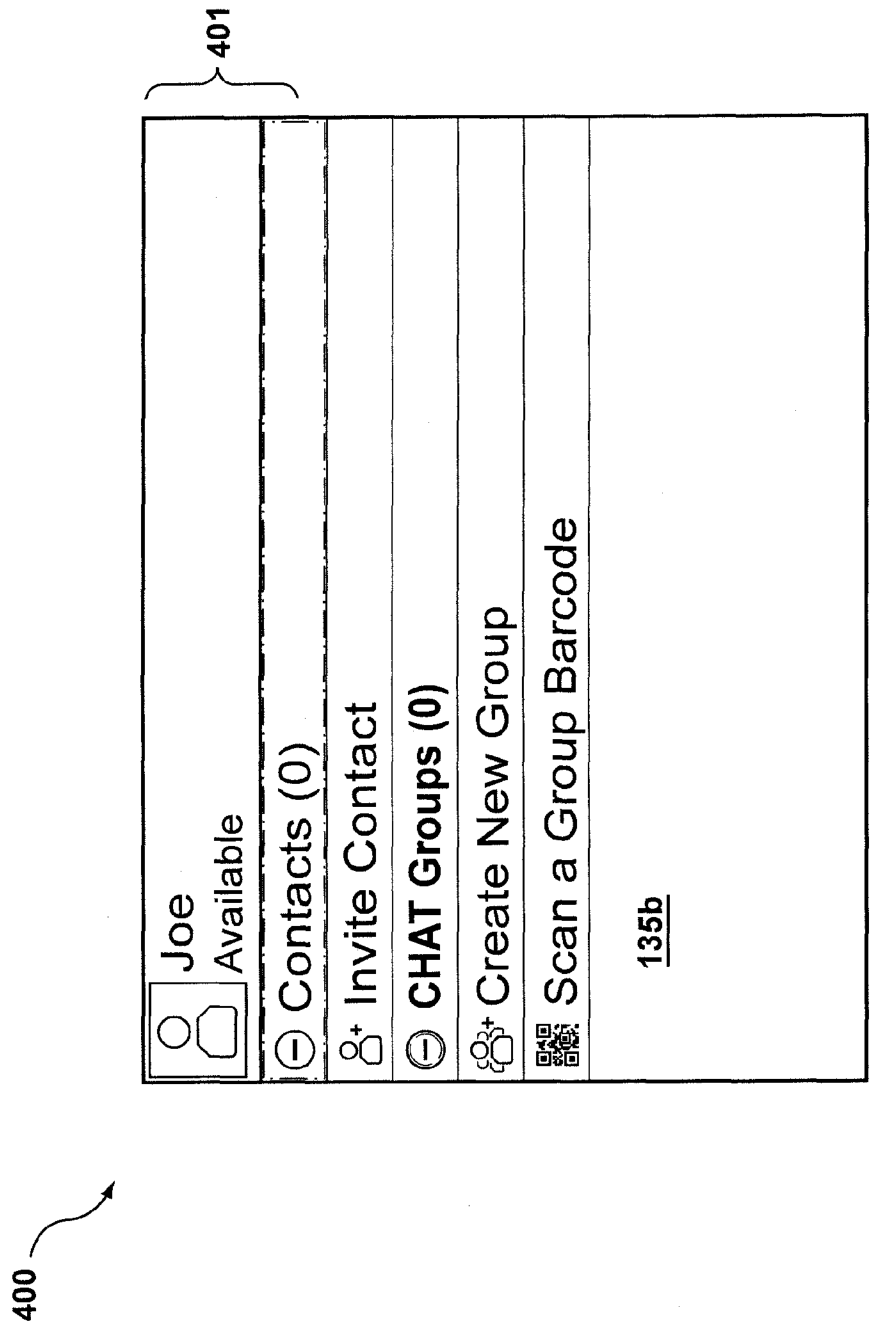

In exemplary implementations depicted in FIGS. 10 and 11 (FIG. 11 being substantially similar to FIG. 10 with like elements having like numbers), receipt of further data triggers at least one of several actions. In depicted implementations, application 135*b* associated with indication 802 is brought to the foreground by controlling display 126 to provide a representation of application 135*b* (e.g. at 311 in method 300): while non-limiting, in depicted implementations, this occurs via a sliding animation with a representation of application 135*b* sliding from top to bottom of GUI 400. For example, processing unit 120 controls circuitry 139 of display 126 to cause the representation of application 135*b* to scroll from banner region 401 to a bottom edge of display 126.

As appreciated from FIGS. 10 and 11, the representation of application 135*h* replaces banner region 401 and indicators 403 in a full screen mode (e.g. as in FIG. 11). From the representation of application 135*b*, the functionality of application 135*b* can be accessed via input device 125. In particular, application 135*b* can be dosed such that resources used by processing unit 120 are reduced (e.g. 313 in method 300).

In some implementations, further input data can trigger application 135*b* to close (e.g. 313 in method 300).

In yet further implementations, a first type of further input data can cause application 135*b* to be brought to the foreground, while a second type of further input data can cause application 135*b* to close. For example, the swipe represented by arrow 1001 can cause application 135*b* to be brought to the foreground and a double tap on indicator 802 can cause the associated application 135*b* to close. However, any combination of further input data is within the scope of present implementations.

Figure 12:
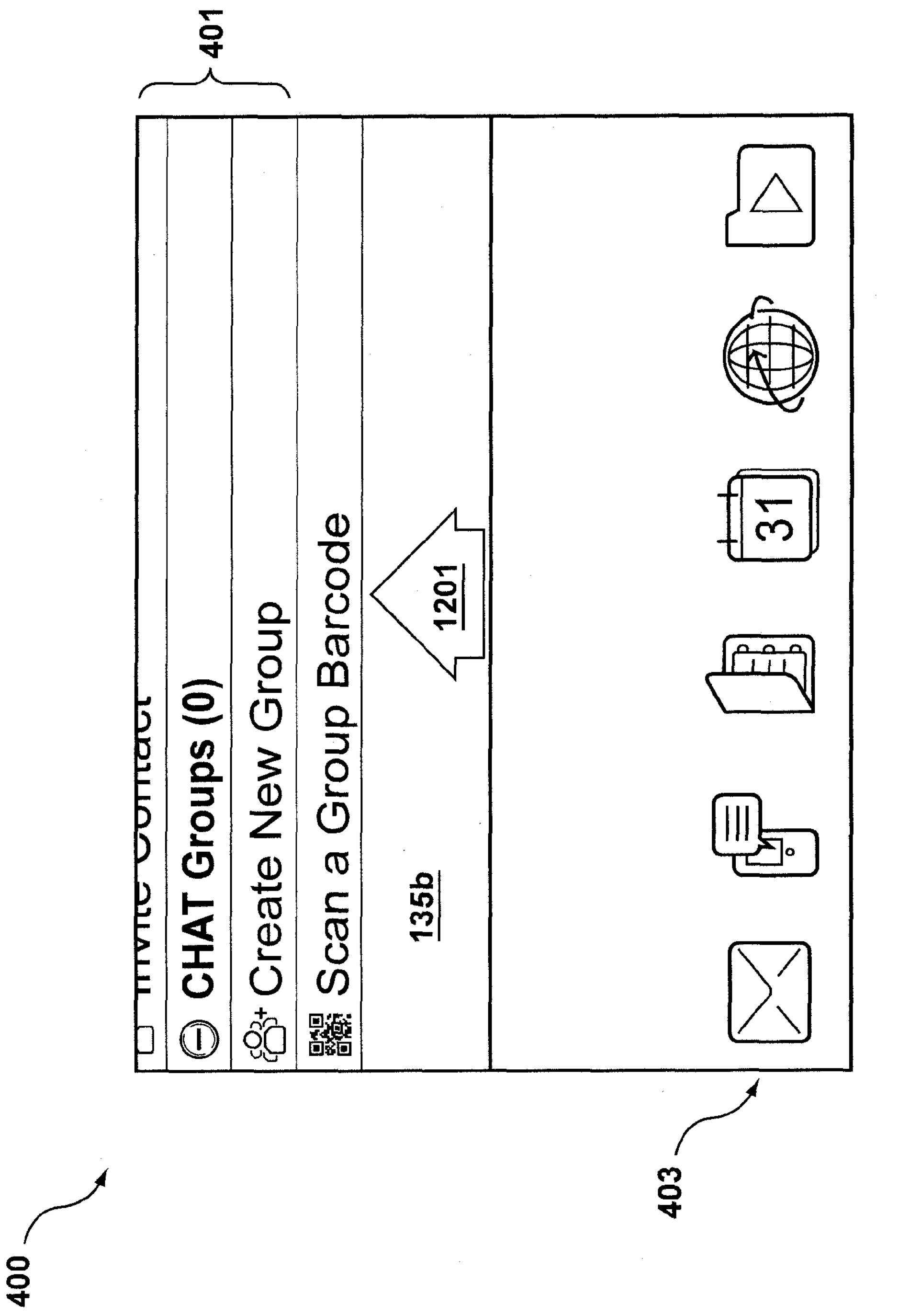

Attention is now directed to FIG. 12, which is substantially similar to FIG. 10 with like elements having like numbers. In these implementations, once the representation of application 135*b* has been brought to the foreground, additional input data can be received from input device 125 causing application 135*b* to be sent to the background and processing unit 120 can responsively control circuitry 139 to cause the representation of application 135*b* to scroll to banner region 401 (e.g. 315 of method 300). As represented by arrow 1201, the additional input data can comprise an upward swipe or the like. Indeed, by the representation of application 135*b* scrolling up into the banner region 401, it is appreciated that such an animation is indicative that application 135*b* has been accessed via banner region 401 and/or application 136.

It is further appreciated that the order in which indications of applications 135 are provided in 307 of method 300 is generally non-limiting as 305-309 are repeated. For example, indications of applications 135 can be provided in the order in which applications 135 were initially processed, alphabetical order, an order of priority and/or any other suitable order. In some implementations, processing unit 120 can generate a list of applications 135 (e.g. a list of suitable identifiers of applications 135) (and/or update the list as applications 135 are opened or closed) and provide the indications of applications 135 by processing the list.

It is yet further appreciated that while method 300 was described with reference to application 135*a* as a first application and application 135*b* as a second application, the order in which indications of applications 135 are provided is generally non-limiting.

It is further appreciated that banner region 401 can be removed from display 126 after receiving further input data, for example at 311 of method 300, as depicted in FIGS. 10-12. Alternatively, though not depicted, banner region 401 can remain at display 126 while the representation of a current application 135 is provided at 311.

In yet further implementations, banner region 401 can be removed from display 126 after a given time period (e.g. a few seconds or any other suitable time period) such that even though the representation of a current application 135 has been generated, next input data similar to the input data represented by arrows 601, 801, can be received during the given time period (e.g. further swipes occur in banner region 401). This causes a next indication of a next application 135 of the plurality of applications 135 to be provided in banner region 401. Hence, a next application 135 can be at least one of brought to the foreground and closed, a representation of a next application 135 replacing a representation of the currently displayed application 135 when the next application 135 is brought to the foreground. The currently displayed application 135 is sent to the background. Hence, rather than scroll through indications of applications 135, the representations of applications 135 can be scrolled through and their functionality accessed.

Indeed, in some implementations, the representations of applications 135 can be provided along with associated indications in banner region 401 such that the representations of applications 135 can be scrolled through rather than just the associated indications.

Indeed, it is appreciated that any suitable method of scrolling through the applications using banner region 401 is within the scope of present implementations.

It is yet further appreciated that while method 300 was described with reference to indication 602 of application 135*a* replacing device state data 402 and indication 802 of application 135*b* replacing indication 802, before application 135*b* is brought to the foreground, method 300 can be described with reference to a first application 135 being brought to the foreground and/or closed. For example, method 300 can comprise (with reference to device 101):

controlling area 230 of display device 126 to provide banner region 401 comprising device state data 402, area 230 of display device 126 enabled to receive focus using input device 125 (e.g. 301 of method 300);

while focus is in banner region 401, receiving first input data, and responsively controlling display device 126 to provide in banner region 401 an indication of a first application 135, indication of first application 135 replacing device state data 402 (e.g. 303 to 307 of method 300); and, receiving further input data while indication of first application 135 is provided in banner region 401 (e.g. 309 of method 300) and, in response, at least one of:

bringing first application 135 to the foreground by controlling display device 126 to provide a representation of first application 135 (e.g. 311 of method 300); and closing first application 135 such that resources used by processing unit 120 are reduced (e.g. 313 of method 300).

In addition, when more than one application 135 is running in the background, method 300 can further comprise:

prior to receiving further input data, successively receiving next input data similar to first input data, and for each set of next input data received, providing a next indication of a next application of plurality of applications 135, next indication replacing a previous indication of a previous application 135 of the plurality of applications 135; and once further input data is received, at least one of:

bringing a present application 135 associated with a presently provided indication provided in banner region 401 to the foreground by controlling display 126 to provide a representation of the present application 135; and closing the present application 135 such that resources used by processing unit are reduced.

In some implementations, in addition to applications 135 being run in the background, indications of commonly used applications (that may or may not be running in the background) can be provided at 307 of method 300. For example, device 101 can be provisioned with a list of applications that are appreciated to be commonly used, and indications of these commonly used applications can be scrolled through in banner region 401 in addition to applications 135 that are being processed in the background.

In any case, by providing an easy and convenient method to access and close applications being run in the background of a portable electronic device, the performance of the portable electronic device can be improved and the battery life of the portable electronic device extended.

Those skilled in the art will appreciate that in some implementations, the functionality of device 101 can be implemented using pre-programmed hardware or firmware elements (e.g., application specific integrated circuits (ASICs), electrically erasable programmable read-only memories (EEPROMs), etc.), or other related components. In other implementations, the functionality of device 101 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method for managing processing resources in a portable electronic device comprising a processing unit interconnected with a display device, a memory device and an input device, said processing unit processing a plurality of applications running in the background such that said plurality of applications are initially not viewable on said display device, said method comprising:

controlling an area of said display device to provide a banner region comprising device state data, said device state data indicating a state of at least one electronic component of said portable electronic device, said area of said display device enabled to receive focus using said input device, any icon that can be selected to execute a function initially absent from said banner region;

while said focus is in said banner region, receiving first input data, and responsively controlling said display device to provide in said banner region an indication of a first application running in the background, said indication of said first application replacing said device state data; and, receiving further input data while said indication of said first application is provided in said banner region and, in response, at least one of:

bringing said first application to the foreground by controlling said display device to provide a representation of said first application; and, closing said first application such that resources used by said processing unit are reduced.

2. The method of claim 1, further comprising:

prior to receiving said further input data, successively receiving next input data similar to said first input data, and for each set of said next input data received, providing a next indication of a next application of said plurality of applications, said next indication replacing a previous indication of a previous application of said plurality of applications; and once said further input data is received, at least one of:

bringing a present application associated with a presently provided indication provided in said banner region to the foreground by controlling said display device to provide a representation of said present application; and closing said present application such that said resources used by said processing unit are reduced.

3. The method of claim 1, wherein said responsively controlling said display device to provide in said banner region an indication of said first application comprises:

controlling circuitry in said area of said display device to cause said device state data to move towards a first lateral edge of said display device; and, controlling said circuitry to cause said indication to appear from a second lateral edge of said display device, said second lateral edge opposite said first lateral edge.

4. The method of claim 1, wherein said bringing said first application to the foreground by controlling said display device to provide a representation of said first application comprises:

controlling circuitry of said display device to cause said representation to scroll from said banner region to a bottom edge of said display device.

5. The method of claim 4, further comprising receiving additional input data causing said first application to be sent to the background and responsively controlling said circuitry to cause said representation to scroll to said banner region.

6. The method of claim 1, further comprising removing said banner region from said display device after receiving said further input data.

7. The method of claim 1, wherein said banner region is removed from said display device after a given time period such that next input data similar to said first input data can be received during said given time period causing a next indication of a next application of said plurality of applications to be provided in said banner region so that said next application can be at least one of brought to the foreground and closed, a representation of said next application replacing said representation of said first application when said next application is brought to the foreground.

8. The method of claim 1, wherein said input device comprises at least one of a touch screen device and a pointing device and said first input data comprises at least one of:

data received from said touch screen device indicative that a lateral swipe has occurred in said area of said display device; and data received from said pointing device indicative that a lateral actuation has occurred at said pointing device.

9. The method of claim 1, wherein said indication of said first application comprises at least one an icon indicative of said first application and text indicative of said first application.

10. A portable electronic device comprising:

a processing unit interconnected with a display device, a memory device and an input device, said processing unit processing a plurality of applications running in the background such that said plurality of applications are initially not viewable on said display device, said processing unit enabled to:

control an area of said display device to provide a banner region comprising device state data, said device state data indicating a state of at least one electronic component of said portable electronic device, said area of said display device enabled to receive focus using said input device, any icon that can be selected to execute a function initially absent from said banner region;

while said focus is in said banner region receiving first input data, responsively control said display device to provide in said banner region an indication of a first application running in the background, said indication of said first application replacing said device state data; and, receive further input data while said indication of said first application is provided in said banner region and, in response, at least one of:

bringing said first application to the foreground by controlling said display device to provide a representation of said first application; and, closing said first application such that resources used by said processing unit are reduced.

11. The portable electronic device of claim 10, said processing unit further enabled to:

prior to receiving said further input data, successively receive next input data similar to said first input data, and for each set of said next input data received, provide a next indication of a next application of said plurality of applications, said next indication replacing a previous indication of a previous application of said plurality of applications; and once said further input data is received, at least one of:

bring a present application associated with a presently provided indication provided in said banner region to the foreground by controlling said display device to provide a representation of said present application; and close said present application such that said resources used by said processing unit are reduced.

12. The portable electronic device of claim 10, wherein to responsively control said display device to provide in said banner region an indication of said first application, said processing unit is further enabled to:

control circuitry in said area of said display device to cause said device state data to move towards a first lateral edge of said display device; and, control said circuitry to cause said indication to appear from a second lateral edge of said display device, said second lateral edge opposite said first lateral edge.

13. The portable electronic device of claim 10, wherein to bring said first application to the foreground by controlling said display device to provide a representation of said first application, said processing unit is further enabled to:

control circuitry of said display device to cause said representation to scroll from said banner region to a bottom edge of said display device.

14. The portable electronic device of claim 13, wherein said processing unit is further enabled to receive additional input data causing said first application to be sent to the background and responsively control said circuitry to cause said representation to scroll to said banner region.

15. The portable electronic device of claim 10 wherein said processing unit is further enabled to remove said banner region from said display device after receiving said further input data.

16. The portable electronic device of claim 10, wherein said banner region is removed from said display device after a given time period such that next input data similar to said first input data can be received during said given time period causing a next indication of a next application of said plurality of applications to be provided in said banner region so that said next application can be at least one of brought to the foreground and closed, a representation of said next application replacing said representation of said first application when said next application is brought to the foreground.

17. The portable electronic device of claim 10, wherein said input device comprises at least one of a touch screen device and a pointing device and said first input data comprises at least one of:

data received from said touch screen device indicative that a lateral swipe has occurred in said area of said display device; and data received from said pointing device indicative that a lateral actuation has occurred at said pointing device.

18. The portable electronic device of claim 10, wherein said indication of said first application comprises at least one an icon indicative of said first application and text indicative of said first application.

19. A computer program product, comprising a non-transitory computer usable medium having a computer readable program code adapted to be executed to implement a method for managing processing resources in a portable electronic device comprising a processing unit interconnected with a display device, a memory device and an input device, said processing unit processing a plurality of applications running in the background such that said plurality of applications are initially not viewable on said display device, said method comprising:

controlling an area of said display device to provide a banner region comprising device state data, said device state data indicating a state of at least one electronic component of said portable electronic device, said area of said display device enabled to receive focus using said input device, any icon that can be selected to execute a function initially absent from said banner region;

while said focus is in said banner region, receiving first input data, and responsively controlling said display device to provide in said banner region an indication of said first application, said indication of a first application running in the background replacing said device state data; and, receiving further input data while said indication of said first application is provided in said banner region and, in response, at least one of:

bringing said first application to the foreground by controlling said display device to provide a representation of said first application; and, closing said first application such that resources used by said processing unit are reduced.

* * * * *